United States Patent [19]
Matsuzaki

[11] Patent Number: 5,124,864
[45] Date of Patent: * Jun. 23, 1992

[54] MAGNETIC HEAD SUPPORTING DEVICE INCLUDING A FLEXIBLE MEMBER OF POLYMERIC RESINOUS MATERIAL

[75] Inventor: Mikio Matsuzaki, Tokyo, Japan

[73] Assignee: TDK Corporation, Tokyo, Japan

[*] Notice: The portion of the term of this patent subsequent to Mar. 19, 2008 has been disclaimed.

[21] Appl. No.: 517,746

[22] Filed: May 2, 1990

[30] Foreign Application Priority Data

May 3, 1989 [JP] Japan .................................. 1-113220

[51] Int. Cl.⁵ .................. G11B 5/60; G11B 5/49; G11B 21/16; G11B 21/21
[52] U.S. Cl. .................................. 360/104; 360/103
[58] Field of Search .............................. 360/103, 104

[56] References Cited

U.S. PATENT DOCUMENTS

| 4,399,476 | 8/1983 | King .................................... 360/103 |
| 4,473,855 | 9/1984 | Plotto et al. ........................ 360/103 |
| 5,001,583 | 3/1991 | Matsuzaki ........................... 360/103 |

*Primary Examiner*—Robert S. Tupper
*Attorney, Agent, or Firm*—Oblon, Spivak, McClelland, Maier & Neustadt

[57] ABSTRACT

A magnetic head supporting device for supporting a magnetic head comprises a flexible member, a magnetic head supporting arm and a magnetic head pressing arm, wherein the flexible member is a plate-like body made of a polymeric resinous material, the magnetic head supporting arm is a pair of supporting arms being spaced apart from each other and attached to the flexible member, and the magnetic head pressing arm is attached to the flexible member and has an end portion extending between the pair of supporting arms.

4 Claims, 7 Drawing Sheets

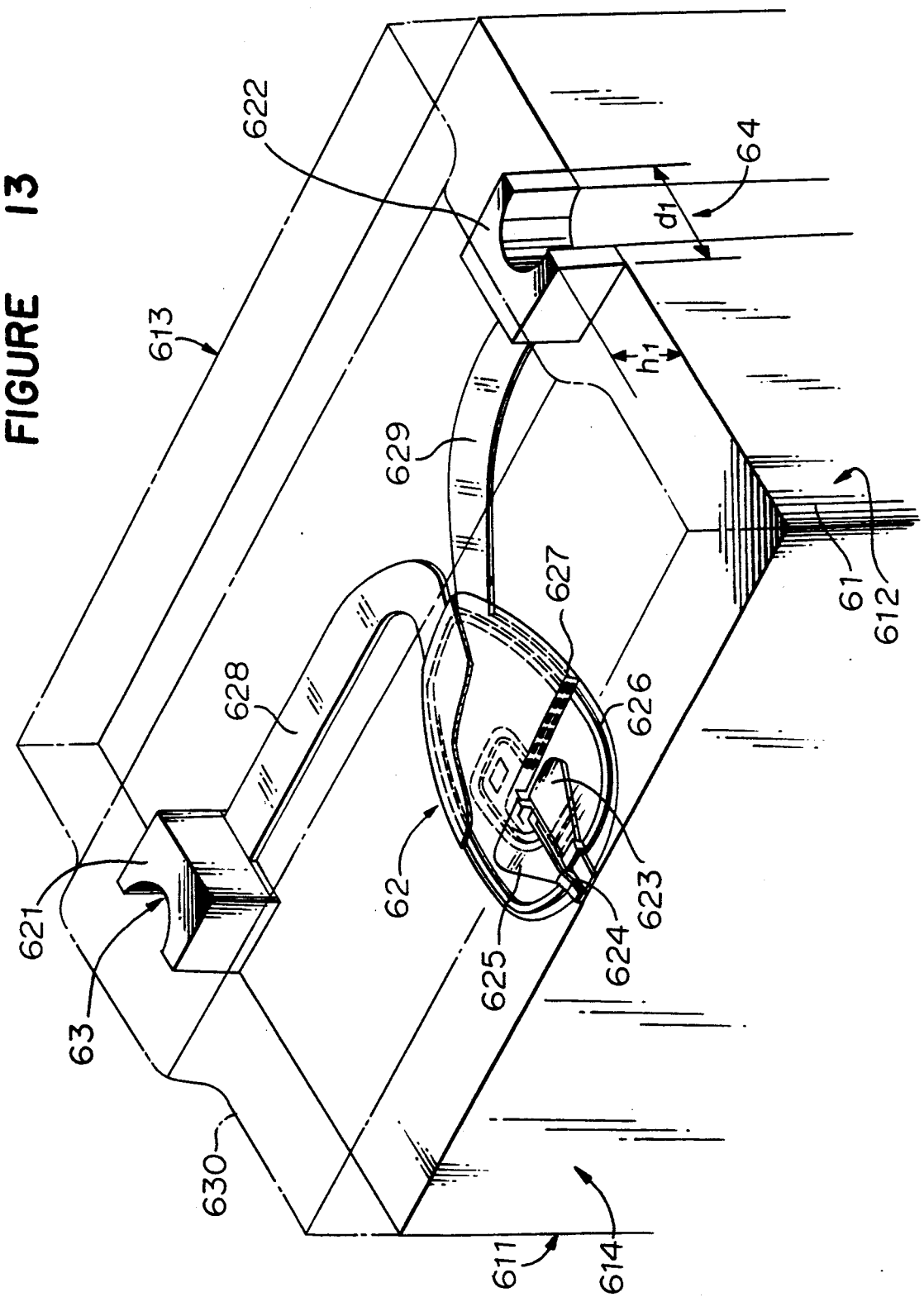

MAGNETIC HEAD SUPPORTING DEVICE INCLUDING A FLEXIBLE MEMBER OF POLYMERIC RESINOUS MATERIAL

BACKGROUND OF THE INVENTION

1. FIELD OF THE INVENTION

The present invention relates to a magnetic head supporting device for supporting a magnetic head, especially, a small-sized thin film magnetic head.

2. DISCUSSION OF BACKGROUND

In the magnetic head supporting device of this type, the following requirements have to be satisfied in order that the thin film magnetic head can follow tracks formed in a surface of the magnetic disk with a predetermined small gap. Namely, a slider of the magnetic head which holds reading/writing elements undergoes a pitching motion with respect to a first axis and a rolling motion with respect to a second axis which perpendicularly intersects the first axis to thereby remove uneven swinging motions. Such magnetic head supporting device is disclosed, for instance, in U.S. Pat. No. 393164 and U.S. Pat. No. 4167765.

The conventional magnetic head supporting device disclosed in the above-mentioned publications is generally constructed as follows. A supporter comprising a resilient spring portion and a rigid beam portion formed integrally with the resilient spring portion is formed of a resilient metal plate such as a stainless steel plate. A flexible member formed also of a resilient metal plate such as stainless steel is attached to a free end of the supporter. A loading projection is provided either on the upper surface of the flexible member or on the lower surface of the supporter at a position near the free end so that a load is applied from the free end of the supporter to the flexible member. Then, a thin film magnetic head which holds a slider having reading/writing elements, is attached to the lower surface of the flexible member.

The magnetic head supporting device of this kind has a tendency that the size of a magnetic head is reduced in order to comply with demands of high density magnetic recording and quick recording. The miniaturization of the magnetic head is effective to reduce a flying height and a spacing loss which are necessary to achieve high density recording as well as to increase resonance frequency; to prevent crashing and to improve durability in association with a magnetic head supporter. Further, the miniaturization of the magnetic head facilitates the maintenance of an appropriate balance between a dynamic pressure and a spring pressure by the supporter, a good floating posture and the obtaining of stable floating characteristic. Furthermore, by reducing the mass of the magnetic head by the miniaturization allows the accessing movement at a high speed.

In the conventional magnetic head supporting device, there were the following problems.

(1) In order to obtain a magnetic head supporting device which effects a low flying height, it is necessary to reduce a dynamic pressure for lifting the magnetic head by reducing the surface area of the air bearing surface of a slider which is a part of the magnetic head. Since the conventional magnetic head supporting device comprises a flexible member constituted by a resilient metallic plate of a material such as stainless steel, the spring function of the flexible member is far stronger than the dynamic pressure for lifting the magnetic head which is produced at the slider, so that when a low flying height is to be obtained, it is difficult to balance the spring function to the dynamic pressure, and it is difficult to obtain a stable control of the posture of the magnetic head.

(2) In order to obtain good balance between the spring function of the flexible member and the dynamic pressure, it is necessary that the flexible member has a complicated shape and structure as described in the above-mentioned publications. However, since the flexible member is made of a resilient metallic plate such as stainless steel, it is difficult for the flexible member to have a complicated structure. In particular, when the size of the slider which is the major part of the magnetic head is made small, in order to achieve a low flying height, the size of the flexible member should also be reduced. Accordingly, the processing of the flexible member is also difficult.

SUMMARY OF THE INVENTION

It is an object of the present invention to provide a magnetic head supporting device having a simple structure, supporting a small-sized magnetic head, assuring an appropriate balance between a dynamic pressure and the spring pressure to thereby assure good posture of floating and stable floating characteristic, and capable of recording at a high density and effecting a accessing movement at a high speed.

The foregoing and other objects of the present invention have been attained by providing a magnetic head supporting device for supporting a magnetic head which comprises a flexible member, a magnetic head supporting arm and a magnetic head pressing arm, wherein the flexible member is a plate-like body made of a polymeric resinous material, the magnetic head supporting arm is a pair of supporting arms being spaced apart from each other and attached to the flexible member, and the magnetic head pressing arm is attached to the flexible member and has an end portion extending between the pair of supporting arms.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 13 is a perspective view of a reading/writing element in the thin film magnetic head shown in FIG. 12.

DETAILED DESCRIPTION OF PREFERRED EMBODIMENTS

Figure 1:
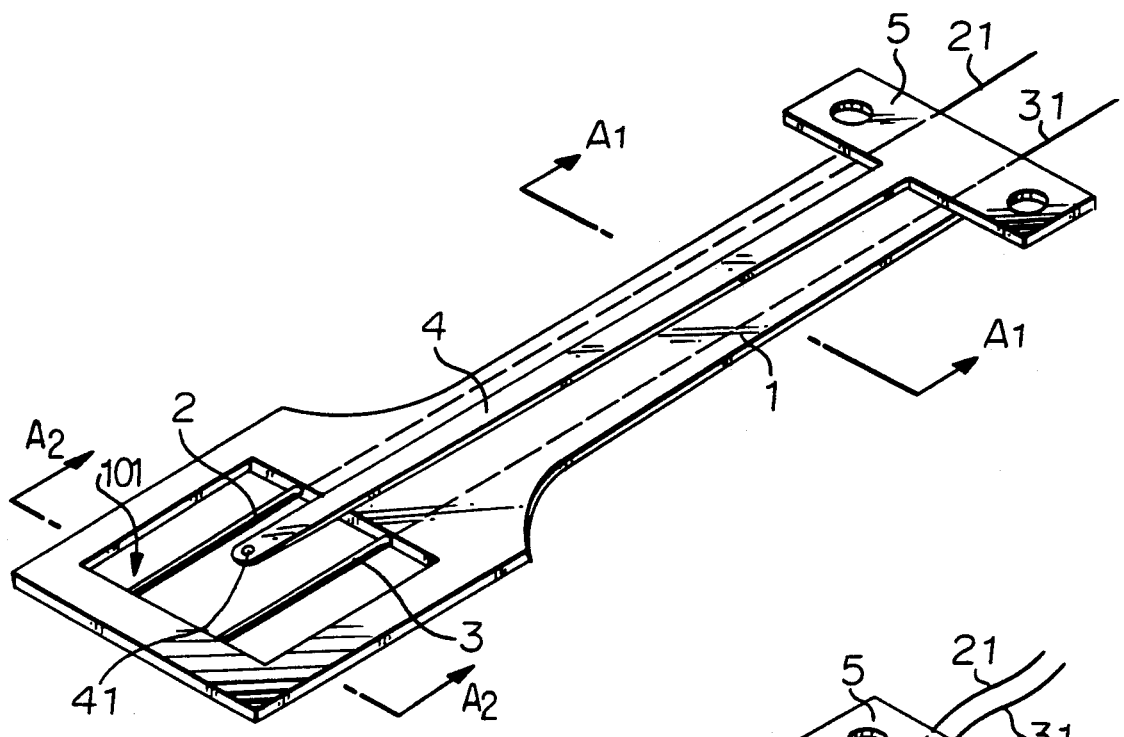
FIG. 1 is a perspective view of an embodiment of the magnetic head supporting device according to the present invention.

Referring to the drawings, wherein the same reference numerals designate the same or corresponding parts throughout the several views, and more particularly to FIG. 1 thereof, there is shown in perspective view an embodiment of the magnetic head supporting device according to the present invention. In FIG. 1, a reference numeral 1 designates a flexible member, numerals 2 and 3 designate magnetic head supporting arms, a numeral 4 designates a magnetic head pressing arm and a numeral 5 designates a fitting piece.

The flexible member 1 is formed in a plate-like shape by using a polymeric resinous material as an insulating material. As a polymeric material used for the flexible member, such a material, e.g. polyimide resin as that having a mechanical strength durable to repeated bending operations and twisting operations and showing an appropriate spring function and elongation is suitable. At one side of the flexible member 1, there is provided an opening 101 where the thin film magnetic head is placed. Thus, by forming the flexible member 1 by a polymeric resinous material, the flexible member 1 shows a weak spring function and a high degree of freedom of twisting and elongation in comparison with the conventional flexible member made of a resilient metallic material such as stainless steel. Accordingly, even in a case that the size of the magnetic head is reduced to reduce a flying height in order to obtain high density magnetic recording, there is still obtainable a balance between the dynamic pressure produced at the slider and the spring function of the flexible member 1, and therefore, a stable control of the posture of the magnetic head can be obtained. Further, the flexible member 1 made of a polymeric resinous material allows easy processing.

Figure 3:
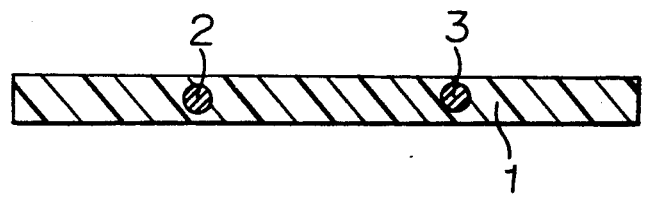
FIG. 3 is a cross-sectional view taken along a line A1—A1 in FIG. 1.

As shown in FIG. 3, the magnetic head supporting arms 2, 3 are embedded in the flexible member 1. Especially, each one end of the supporting arms 2, 3 is apart from each other in a parallel relation in the opening 101. In this embodiment, the supporting arms 2, 3 are formed of an electric conductive material. Accordingly, they function as lead wires for the magnetic head. Each other end 21, 31 is led outside the flexible member 1 so that the other ends are connected to the magnetic disk drive.

A fitting piece 5 made of a rigid material such as metal is integrally attached to the other end of the flexible member 1 by means of bonding. The magnetic head pressure arm 4 extends from the fitting piece 5 through the upper surface of the flexible member 1 to an area of the opening 101 so that the free end 41 of the pressure arm 4 terminates a position between the magnetic head supporting arms 2, 3 which are exposed in the opening 101.

Figure 4:
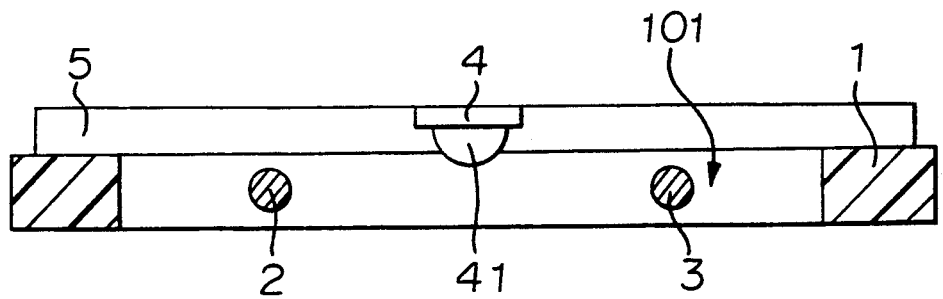
FIG. 4 is a cross-sectional view taken along a line A2—A2 in FIG. 1.
Figure 5:
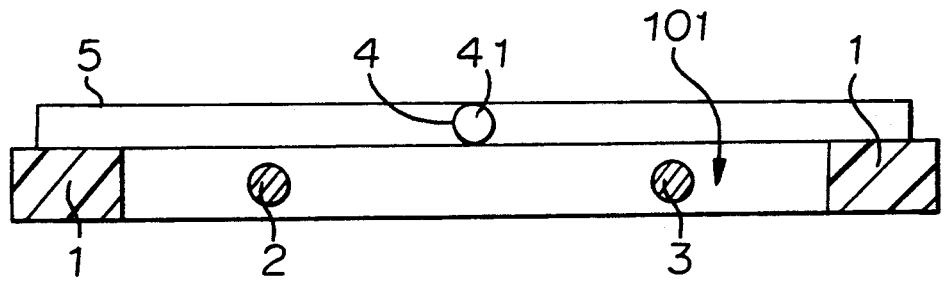
FIG. 5 is a cross-sectional view similar to FIG. 4 of another embodiment of the magnetic head supporting device of the present invention.

The magnetic head pressure arm 4 may be independent from the fitting piece 5 so that the pressing arm 4 is separately attached to the flexible member 1. The free end portion 41 of the magnetic head pressing arm 4 may have a projection as shown in FIG. 4, or may have a circular shape in cross section as shown in FIG. 5. Further, it may have a rectangular shape in cross section although not shown in drawing.

Figure 2:
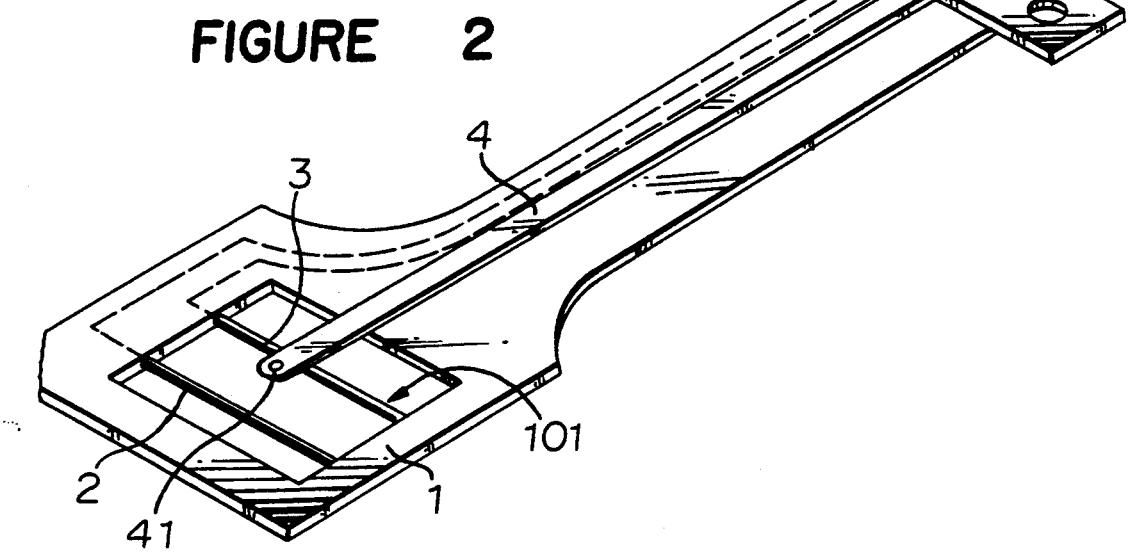
FIG. 2 is a perspective view of another embodiment of the magnetic head supporting device according to the present invention.

FIG. 2 shows another embodiment of the magnetic head supporting device according to the present invention. In this embodiment, a pair of magnetic head supporting arms 2, 3 are arranged in parallel to each other and in the direction perpendicular to the longitudinal direction of the flexible member 1. The other construction of this embodiment is the same as the embodiment as shown in FIG. 1.

The shape and construction of the magnetic head to be held by the magnetic head supporting device of the present invention is not particularly limited, and a well-known magnetic head or any magnetic head which will be proposed can be used.

Figure 6:
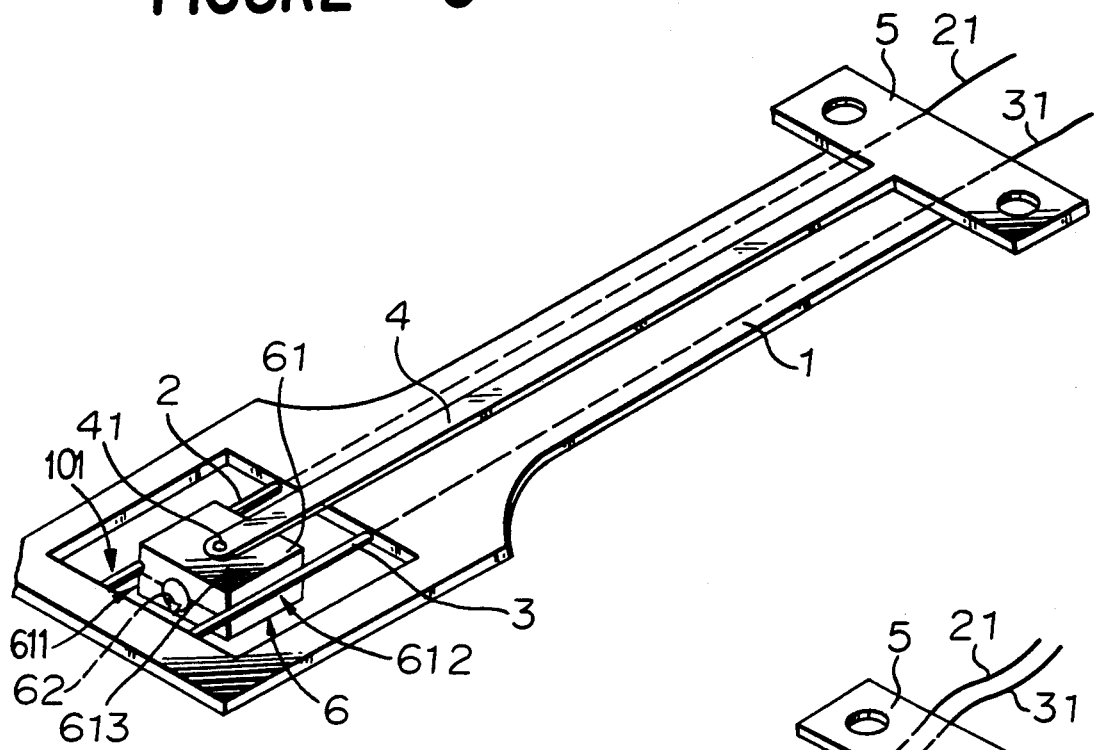
FIG. 6 is a perspective view showing a combination of the magnetic head supporting device shown in FIG. 1 and a thin film magnetic head.
Figure 7:
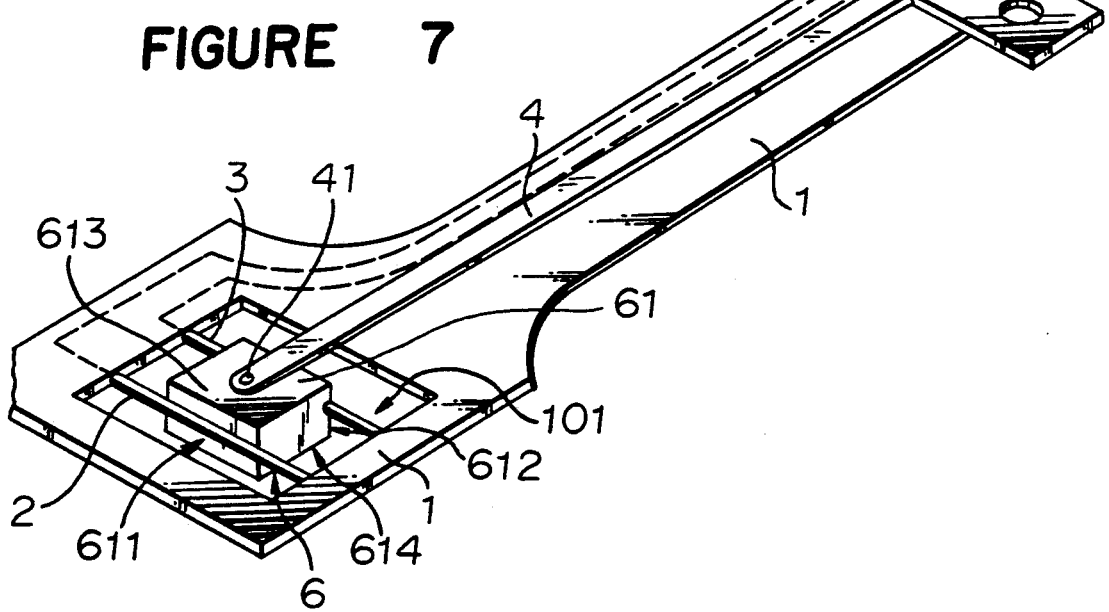
FIG. 7 is a perspective view showing a combination of the magnetic head supporting device shown in FIG. 2 and thin film magnetic head.

FIG. 6 shows an example of a combination of the magnetic head supporting device as shown in FIG. 1 and a thin film magnetic head, and FIG. 7 shows an example of a combination of the magnetic head supporting device as shown in FIG. 2 and a thin film magnetic head. In FIGS. 6 and 7, a reference numeral 6 designates a thin film magnetic head in which a thin film reading/writing element 62 is attached to an end surface of a slider 61.

In the combination of the magnetic head supporting device and the magnetic head 6, the magnetic head supporting arms 2, 3 are respectively attached to opposing side surfaces 611, 612 of the slider 61 by means of bonding. The free end portion 41 of the pressing arm 41 is brought to contact with the upper surface 613 of the slider 61. The free end 41 of the magnetic head pressing arm 4 is in spring-contact with the upper surface 613 of the slider 61 so that the thin film magnetic head 6 receives a load from the pressing arm 4 downwardly.

FIG. 6 shows the thin film magnetic head 6 which is oriented along the longitudinal direction of the flexible member 1. FIG. 7 shows the thin film magnetic head 6 which is oriented in the direction perpendicular to the longitudinal direction of the flexible member 1. A numeral 614 designates an air bearing surface.

Figure 8:
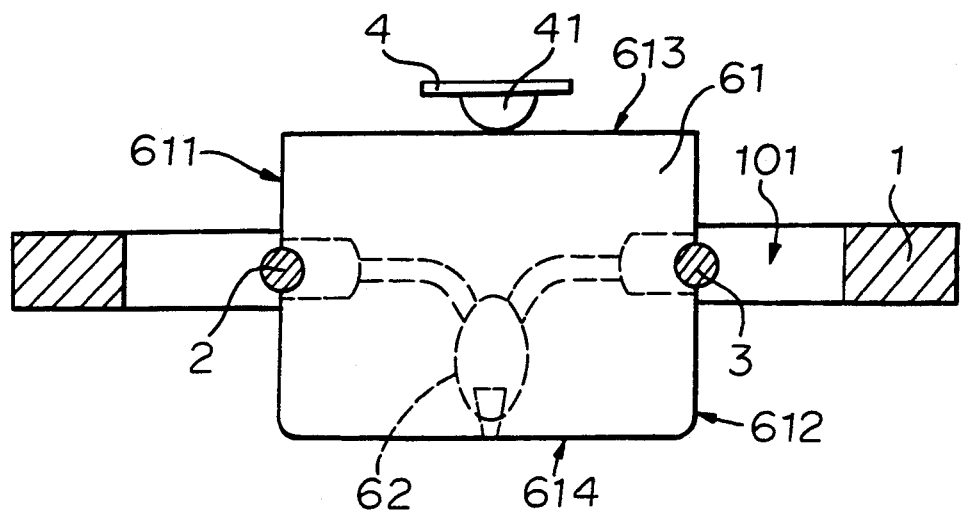
FIG. 8 is a cross-sectional view of an important portion of the combination shown in FIG. 6.
Figure 9:
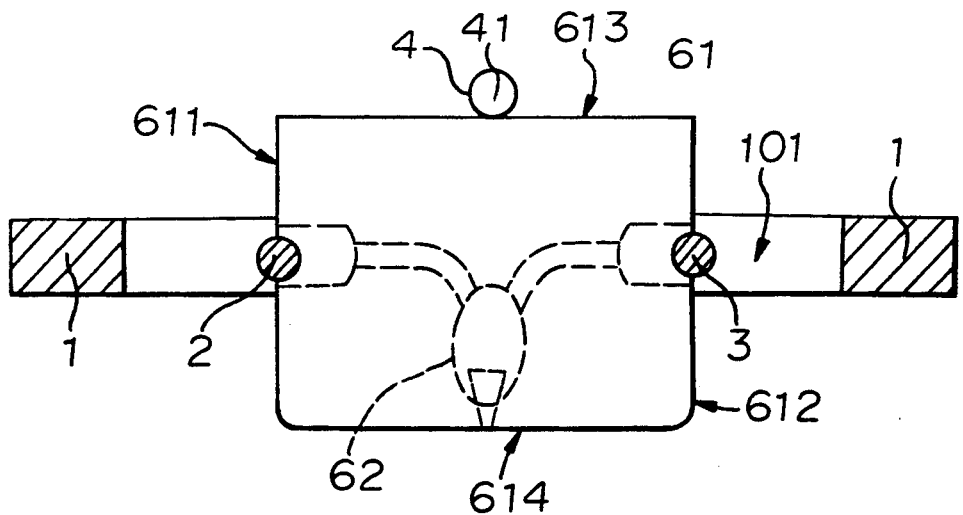
FIG. 9 is a cross-sectional view of an important portion of the combination shown in FIG. 7.

In a case that the free end portion 41 of the magnetic head pressing arm 4 has a projection as shown in FIG. 4, the contact of the projection 41 to the upper surface 613 of the slider 41 is of a point contact type as shown in FIG. 8. On the other hand, in a case that it has a projection having a circular form in cross section as shown in FIG. 5, the contact of the projection is of a line contact as shown in FIG. 9.

Figure 10:
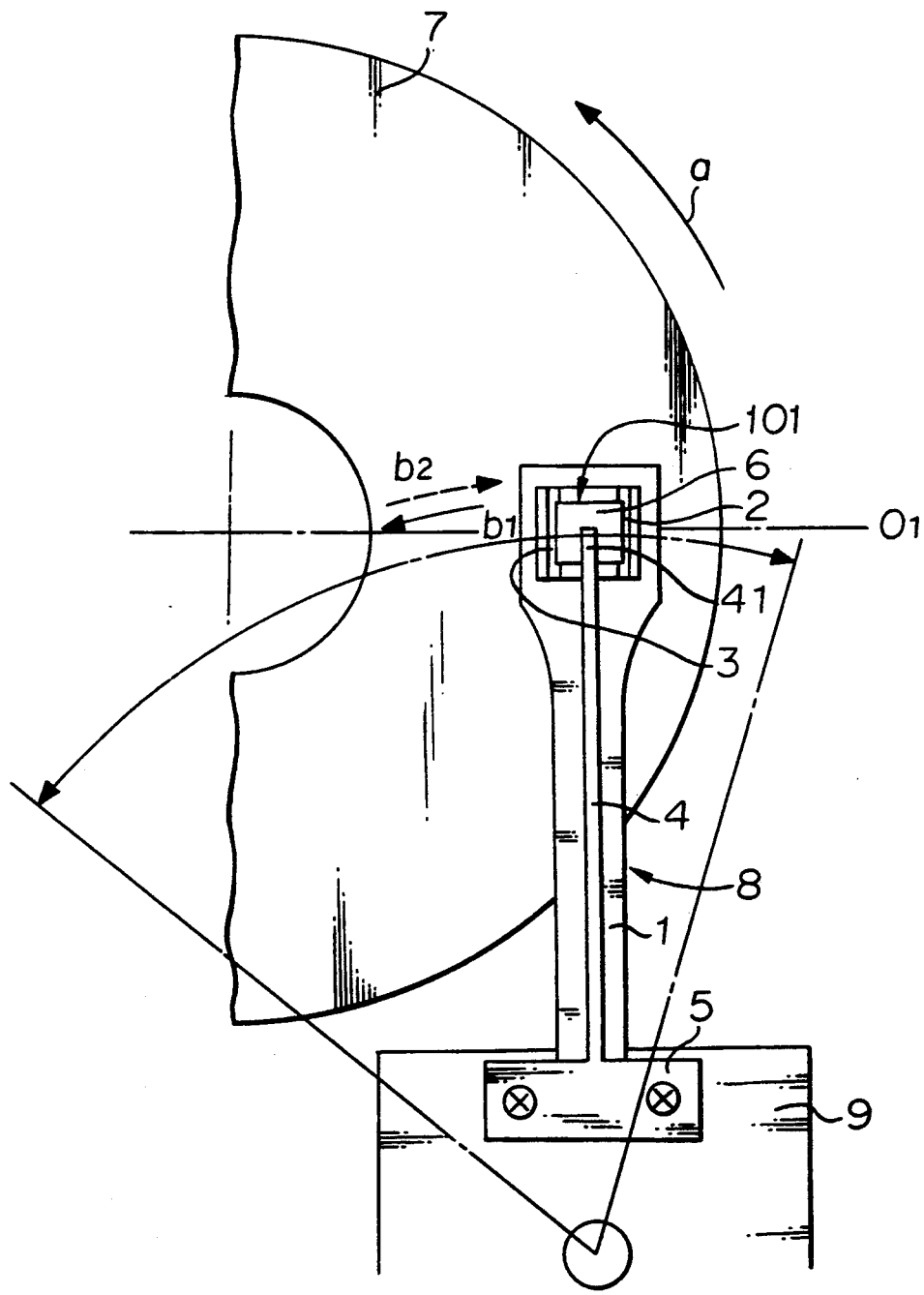
FIG. 10 is a plane view showing a relation of the magnetic head supporting device of the present invention which is shown in FIG. 1 to a magnetic disk.

FIG. 10 is a plane view showing a relation of the magnetic head supporting device of the present invention as shown in FIG. 1 to a magnetic disk, wherein a numeral 7 designates the magnetic disk, a numeral 8 designates the magnetic head supporting device of the present invention and a numeral 9 designates a position determining unit. The magnetic disk 7 is driven to rotate in the direction indicated by an arrow mark a by means of a rotation driving unit (not shown). The magnetic head supporting device 8 is driven by the position determining unit 9 so that the thin film magnetic head 5 performs a turning movement on the diameter $O_1$ of the magnetic disk 7 in the direction indicated by an arrow mark $b_1$ or $b_2$. Thus, reading operations or writing operations can be attained on a track in the magnetic disk 7.

Figure 11:
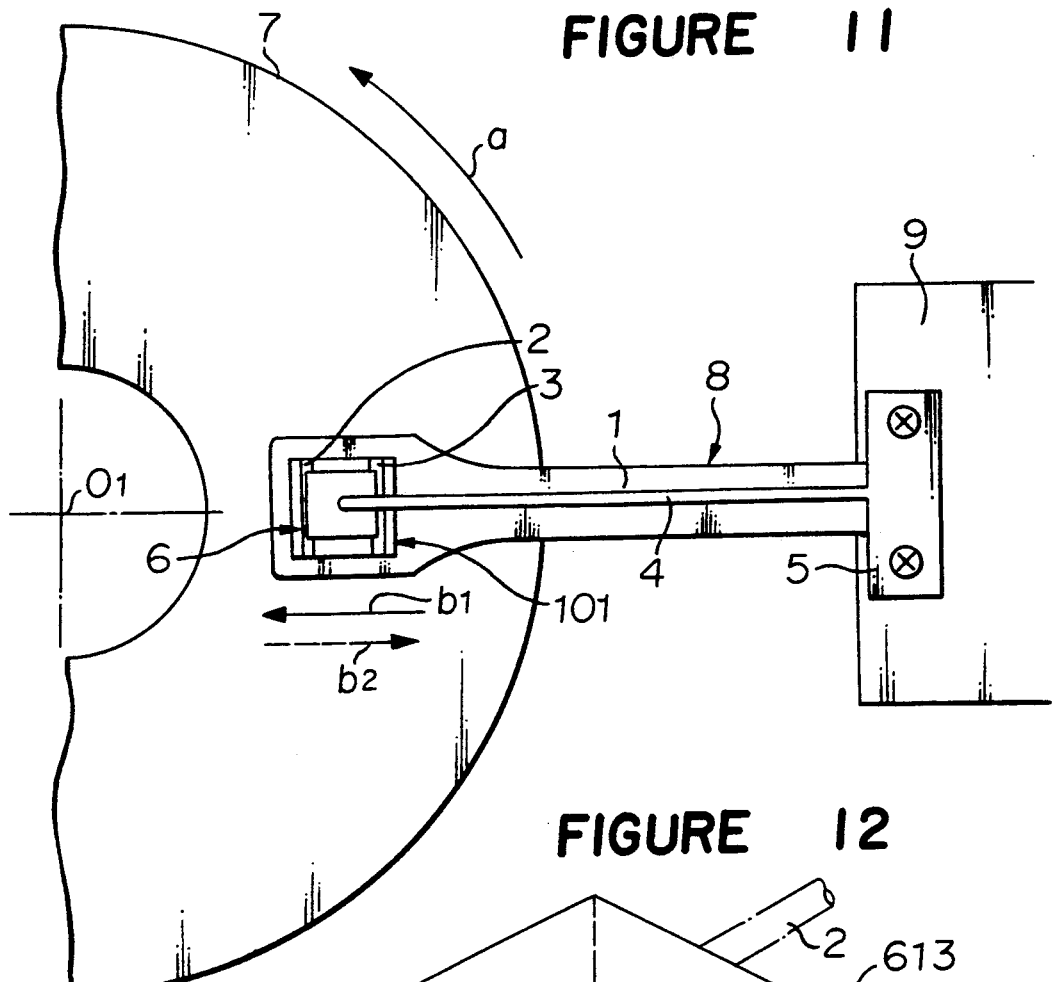
FIG. 11 is a plane view showing a relation of the magnetic head supporting device shown in FIG. 2 to a magnetic disk.

FIG. 11 is a plane view showing a positional relation of the magnetic head supporting device as shown in FIG. 2 to a magnetic disk. In FIG. 11, the thin film magnetic head 6 of the magnetic disk 7 is linearly moved on the diameter $O_1$ in the direction of an arrow mark $b_1$ or $b_2$.

Figure 12:
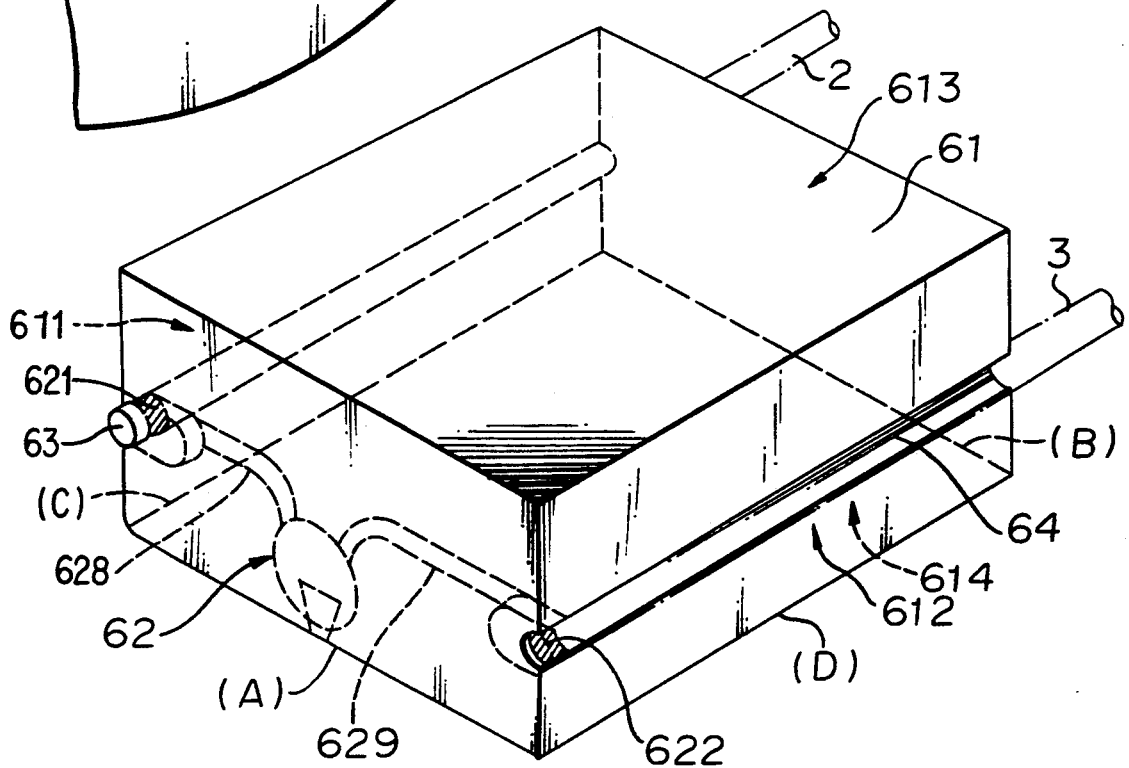
FIG. 12 is a perspective view of a thin film magnetic head which is suitably assembled to the magnetic head supporting device of the present invention.

An embodiment of the thin film magnetic head which is suitable for being combined with the magnetic head supporting device of the present invention will be described. FIG. 12 is an enlarged perspective view of the thin film magnetic head. An air bearing surface 614 is formed in a slider 61 so as to oppose a magnetic recording medium. The air bearing surface 614 is made flat without having rail portions and taper portions which produce a lifting force. It is preferable that edges A, B formed at the air bearing surface, which are respectively the air-inflow end and the air discharge end, are respectively in a form of an arc so that the dragging of the slider 61 to the surface of a magnetic disk at the time of contact-start can be eliminated. Other edges C, D may be in a form of an arc.

The slider 61 comprises a substrate of $Al_2O_3 \cdot TiC$ on which an insulating film 110 of a material such as alumina or the like is coated, and the reading/writing element 62 is formed on the insulating film.

A reading/writing element 62 is formed in an end surface which is provided at the side of air-discharging with respect to an air flow flowing in association with the magnetic recording medium. In this embodiment, a single reading/writing element 62 is used, and the element is arranged at an intermediate portion in the direction of width of the slider 61.

Bonding pads 621, 622 for the reading/writing element 62 are introduced to opposing side surfaces 611, 612 of the slider 61. Further, grooves 63, 64 in a form of stripe are formed in the opposing side surfaces 611, 612 of the slider 61 in its entire length so as to extend through the bonding pads 63, 64.

FIG. 13 is a perspective view showing the construction of the reading/writing element 62. In FIG. 13, a reference numeral 623 designates a lower magnetic film, a numeral 624 designates a gap film made of a material such as alumina, a numeral 625 designates an upper magnetic film, a numeral 626 designates conductor coil films, a numeral 627 designates an insulating film made of an organic resinous material such as novolak resin, and numerals 628, 629 designate lead electrodes.

Each end portion of the lower and upper magnetic films 623, 625 constitute a pole section which opposes each other with the gap film 624 having a small thickness. The pole sections perform reading and writing function. The lower magnetic film 623 is connected with the upper magnetic film 625 at the position opposite the pole sections. The conductor coil films 626 are formed so as to surround around the connecting portion in a spiral form.

The lead electrodes 628, 629 have their one ends connected to both ends of the conductor coil films 626 and other ends connected to the bonding pads 621, 622.

The bonding pads 621, 622 are exposed at the opposing side surfaces 611, 612 of the slider 61. The bonding pads 621, 622 are formed as plated films so that the surface areas exposed at the opposing side surfaces 611, 612 have a sufficient surface areas necessary to connect the lead wires. Specifically, each of the surface areas has a width $d_1$ of about 100–250 $\mu$m and a height $h_1$ of about 50 $\mu$m.

The bonding pads 621, 622 are covered by a protective film 630. In the conventional magnetic head, it was necessary to polish the surface of the protective film 630 to thereby expose the electrode surfaces of the bonding pads so as to bond the lead wires. In the present invention, however, such polishing work is unnecessary to thereby simplified manufacturing steps.

In the combination of the magnetic head with the magnetic head supporting device, the magnetic head 6 is placed between the supporting arms 2, 3 in the opening 101, each of the supporting arms 2, 3 is connected to each of the opposing side surfaces of the magnetic head 6, and the supporting arms 2, 3 are respectively connected to the bonding pads 621, 622 exposed at the opposing surfaces, by means of soldering.

In this embodiment, grooves 63, 64 are formed in a stripe in the opposing side surfaces 611, 612 of the slider 61 over the entire length of the slider, the grooves being communicated with the bonding pads 621, 622, whereby the supporting arms 2, 3 can be placed correctly in position in the grooves 63, 64 and they are connected to the bonding pads 621, 622. Accordingly, reliability in determining the position of the magnetic head 6 to the supporting arms 2, 3 and the connection in electrical and mechanical sense of the former to the later can be improved.

Since the bonding pads 621 or 622 for the reading/writing element 62 are formed in the opposing side surfaces 611, 612 of the slider 61, the width of an end surface where the reading/writing element 62 is formed can be reduced to thereby reduce the surface area of the end surface, whereby the entire size of the thin film magnetic head can be reduced unlike the conventional technique wherein the bonding pads 621, 622 are formed in the same end surface where the reading/writing element 62 is formed. Specifically, the size of the slider 61 can be reduced in such a manner that the thickness from the air bearing surface 614 to the opposing upper surface is 0.66 mm or less, the length in the direction of air flow is in a range of 0.6 mm–2 mm and the width in the direction perpendicular to the direction of air flow is in a range of about 0.6 mm–2 mm.

Further, in the above-mentioned small-sized magnetic head, since grooves 63, 64 are formed, the magnetic head supporting arms 2, 3 which also serve as lead wires can be fitted to the grooves 63, 64 and they can be certainly and stably connected to the bonding pads 621, 622.

Further, since a cut surface of a wafer when the wafer is cut to obtain separate thin film magnetic heads in manufacturing steps is utilized as the side surface 611 or 612 on which the bonding pad or pads 621, 622 are to be introduced, the bonding pads 621, 622 can be exposed at the side surface 611 or 612 as soon as the cutting operation has finished.

In the above-mentioned embodiment, explanation is made as to use of an in-plane recording and reproducing thin film magnetic head. However, the present invention is applicable to a vertical magnetic recording and reproducing thin film magnetic head. Further, the present invention is applicable to a thin film magnetic produce a floating force in the air bearing surface.

Thus, in accordance with the present invention, the following effects can be obtained.

(a) The flexible member made of the polymeric resinous material has a high degree of freedom of twisting and elongation. Accordingly, there is obtainable a magnetic head supporting device which assures the balance between the dynamic pressure for floating on the slider and the elasticity of the flexible member and stable posture of the magnetic head even when the magnetic head is miniaturized to thereby reduce a flying height and to increase the density of the magnetic recording.

(b) Since the flexible member is formed by a polymeric resinous material, the flexible member can be easily machined and assembled.

(c) A pair of the magnetic head supporting arms which are spaced apart from each other in a parallel relation are attached to the flexible member, and the magnetic head pressing arm is attached to the flexible member so that an end of the pressing arm terminates between the supporting arms, whereby the construction of the magnetic head supporting device of the present invention is simple while there are obtainable a pitching motion, a rolling motion and a loading action which are required for magnetically recording and reproducing to a magnetic disk.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic head supporting device for supporting a magnetic head, said supporting device comprising:
    a flexible member;
    a pair of magnetic head supporting arms for supporting the magnetic head, said magnetic head supporting arms being spaced apart from each other and attached to the flexible member; and
    a magnetic head pressing arm attached to the flexible member and having an end portion extending between said pair of supporting arms for contacting said magnetic head, wherein the flexible member is a plate-like body made of a polymeric resinous material.

2. The magnetic head supporting device according to claim 1, wherein the pair of magnetic head supporting arms extend in parallel to the each other and in the longitudinal direction of the flexible member.

3. The magnetic head supporting device according to claim 1, wherein the pair of magnetic head supporting arms extend in parallel to each other and in the direction perpendicular to the longitudinal direction of the flexible member.

4. The magnetic head supporting device according to claim 1, wherein an opening is formed at an end portion in the longitudinal direction of the flexible member; the pair of magnetic head supporting arms extend across the opening, and the free end of the magnetic head pressing arm terminates at a central portion of the opening.

* * * * *